United States Patent

Campani et al.

[11] Patent Number: 6,138,889
[45] Date of Patent: Oct. 31, 2000

[54] DEVICE FOR ASSEMBLING MOTOR-VEHICLE BODIES BY SPOT-WELDING

[75] Inventors: Giancarlo Campani, Turin, Italy; Bernd Konigsbrugge, Köfering, Germany

[73] Assignee: Comau S.p.A., Turin, Italy

[21] Appl. No.: 09/240,600

[22] Filed: Feb. 1, 1999

[30] Foreign Application Priority Data

Feb. 3, 1998 [EP] European Pat. Off. ............. 98830047

[51] Int. Cl.⁷ .......................... B23K 37/00; B23K 31/02
[52] U.S. Cl. ........................ 228/4.1; 228/177; 228/180.1
[58] Field of Search ................... 228/4.1, 180.1, 228/180.21, 177, 178, 6.1

[56] References Cited

U.S. PATENT DOCUMENTS

| 4,162,387 | 7/1979 | De Candia | 219/79 |
|---|---|---|---|
| 4,256,947 | 3/1981 | De Candia | 219/79 |
| 4,448,341 | 5/1984 | Fujikawa et al. | 228/45 |
| 4,483,476 | 11/1984 | Fujikawa et al. | 228/4.1 |
| 4,682,722 | 7/1987 | Bossotto et al. | 228/41 |
| 4,856,698 | 8/1989 | Marianne et al. | 228/4.1 |
| 4,905,884 | 3/1990 | Alborante et al. | 228/4.1 |
| 5,111,988 | 5/1992 | Strickland | 228/102 |
| 5,174,488 | 12/1992 | Alborante | 228/4.1 |
| 5,226,584 | 7/1993 | Numata et al. | 228/182 |
| 5,397,047 | 3/1995 | Zampini | 228/6.1 |
| 5,400,943 | 3/1995 | Rossi | 228/6.1 |
| 5,902,496 | 5/1999 | Alborante | 219/86.24 |
| 6,008,471 | 12/1999 | Rossi | 219/158 |

*Primary Examiner*—Patrick Ryan
*Assistant Examiner*—Zidia T. Pittman
*Attorney, Agent, or Firm*—Sughrue, Mion, Zinn, Macpeak & Seas, PLLC

[57] ABSTRACT

There is described a device for welding motor-vehicle bodies, comprising a welding station provided with welding programmable robots, to which the floor panels of the bodies to be welded are fed along a vertical direction by a lifting device. The component elements of the sides of the body to be welded are brought to the assembling position by means of two locating gates, provided with self-propelled lower carriages, which are movable on rails between a working position, at the two sides of the floor panel of the body to be welded, and a waiting position, in which they may receive the component elements of the body sides. The elements of the rear part of the body are carried by a third locating frame arranged transversally between the two guiding rails of the side locating gates.

5 Claims, 7 Drawing Sheets

DEVICE FOR ASSEMBLING MOTOR-VEHICLE BODIES BY SPOT-WELDING

BACKGROUND OF THE INVENTION

The present invention relates to a device for assembling motor-vehicle bodies by spot-welding, comprising:

a welding station, provided with programmable robots having spot-welding heads, means for feeding motor-vehicle body floor panels in sequence to the welding station, a pair of locating gates on two opposite sides of the welding station, provided with devices for receiving and supporting elements forming two motor-vehicle body sides which are to be assembled with a respective floor panel, wherein said locating gates are provided with self-propelled lower carriages, guided on two parallel rails provided on the floor of the welding station, at the two sides thereof, wherein said gates are movable on said rails between a working position, adjacent to the two sides of the floor panel which is located at the welding station, and a waiting position, spaced longitudinally from the working position, wherein when said locating gates are in their waiting positions, they are able to receive and support elements forming the sides of a body to be assembled, wherein when said locating gates are in their working position, they are able to move transversally relative to the longitudinal direction of said rails, coming closer to each other until they reach an operative position immediately adjacent to the floor panel which is located at the welding station, wherein said locating gates are provided with locating and locking means able to enter into operation when said gates are at their operative position for causing engagement of the elements forming the sides carried by said gates and the floor panel which is located at the welding station with each other, in order to keep them in a proper position for assembling the body, while said robots carry out a number of welding spots, and means for feeding the assembled body out of the welding station.

A device for assembling motor-vehicle bodies by spot-welding, having the above indicated features, has been proposed in Italian patent application No. TO96A000817 filed on Oct. 8, 1996 and still secret at the filing date of the present application.

SUMMARY OF THE INVENTION

The object of the present invention is that of further improving the previously proposed device both from the standpoint of simplicity and reduced dimensions of the plant, and from the standpoint of production efficiency.

In view of achieving this object, the invention provides a device having all the above indicated features and further characterized in that:

said means for feeding the floor panels to the welding station and said means for feeding the assembled bodies out of the welding station are constituted by an overhead conveyor, which is at an elevated position relative to the welding station, and comprising a line portion upstream of the welding station for conveying the floor panels to be assembled, and a line portion downstream of the welding station for conveying the assembled bodies, as well as by a lifting device provided with vertically movable supporting means, for picking up a floor panel from the overhead conveyor line and lowering said floor panel down to the welding station, where it is taken by locating and supporting means provided at the welding station, and for lifting afterwards the assembled body from the welding station up to the overhead conveyor line, said programmable robots are able to carry out firstly a number of welding spots for framing the body, while the body is being locked by the locating gates, and later on a number of welding spots for completing welding of the body, while the locating gates have already been disengaged from the body and have returned to their waiting position, at which they are able to receive the elements forming the sides of a new body, simultaneously with the execution of said welding spots for completing the body which is at the welding station.

Therefore, the device according to the invention is able to carry out, at a single station, both the operation of preparing the elements forming the sides of the body, and the operation of framing the whole body, while the latter is being locked by the locating gates, as well as the operation of completing welding of the body after disengagement of the locating gates.

The applicants have devised a preferred embodiment of the present invention which is particularly advantageous in the production of a motor-vehicle body of the "station-wagon" type, within a plant for manufacturing also different (such as sedan and coupe) versions of the same model. Typically, assembling of the station-wagon version of the body requires execution of a number of welding spots which is much higher (about double) with respect to the welding spots required for other versions of the same models. It is now a conventional technique to provide a single production line for all the versions of the same body model. The floor panels of the various versions are fed in sequence by the same line either to a flexible welding station, which is able to operate on different body types, or to a series of welding stations each dedicated to a respective model, each floor panel fed along the line receiving the remaining parts of the body at the respective station, while it is not subject to any operation when it stops at the other stations which are dedicated to the other versions of the model in production. Typically, the number of welding spots required for framing a motor-vehicle body of the sedan or coupe type is substantially similar, so that once the number has been determined of the robots present at the welding station provided for these models, the line cycle time, i.e. the duration of each stop at the welding station of the structures to be welded which advance intermittently along the line, is substantially the same, e.g. in the order of 1 minute. If the same line had to be used also for assembling the bodies of the station-wagon version, without modifying the number of robots present at each welding station, a substantial increase (about double) of the cycle time would be required, which would involve a substantial decrease in productivity. Naturally, this drawback may be overcome by increasing the number of robots present at the welding station substantially, but this would involve an increase in cost which generally is not justified, considering the percentage of bodies of the station-wagon version with respect to the total number of bodies in production. Furthermore, there are limits to the maximum number of robots beyond which it becomes difficult for the robots to operate without interfering with each other.

The body assembling device according to the present invention is able to solve the above indicated problem brilliantly. Indeed, this device may be used, in a plant for manufacturing the same motor-vehicle body model in different versions, only for assembling the bodies of the station-wagon version, separately from the main line for producing the other body versions. The above mentioned overhead conveyor line may be used for conveying in sequence the floor panels of all the body types (such as sedan, coupe and station-wagon). However, the floor panels of the station-wagon version are detoured from the main conveyor line, upstream of the welding stations dedicated to the other body versions, in order to be assembled by the device according to the invention with a cadence totally independent from the cadence of the main production line. Therefore, assembling of the bodies of the station-wagon version may be carried out at a cycle time even greater than that of the main production line, without jeopardizing the cost of the plant by providing an excessive number or robots. The assembled station-wagon bodies going out of the device according to the invention are then introduced again into the main production line by which they are fed through the other welding stations of the plant dedicated to the other versions (sedan and coupe), naturally without being subject to any operation at such stations, but rather simply advancing through them at the cadence of the main production line, which therefore is not slowed down by the need of assembling bodies of the station-wagon version.

The above mentioned feeding means of the device according to the invention, including the lifting device with vertically movable supporting means, enable the above indicated result to be achieved while occupying a minimum space, seen in plan view, in the plant. Furthermore, as clearly apparent from the foregoing, although the device according to the invention in principle is for operating on a single type of body, it is provided with locating gates which nevertheless are moved along the above mentioned guiding longitudinal rails, so that the two locating gates may already receive the elements forming the sides of a new body to be assembled while the robots at the welding station are still carrying out the welding spots for completing welding of the previous body, to advantage for the production efficiency.

Naturally, the device according to the invention is of general application, independent from the above mentioned example of a production of station-wagon bodies and may be adopted each time that the above described advantages of reduced dimensions and production efficiency render its application useful.

Yet in the above mentioned preferred embodiment of the invention, the device is further characterized in that at the welding station, transversally to said guiding rails, there is provided a third locating frame for receiving and locking elements forming the rear portion of the body to be assembled, said locating frame being pivotally mounted around an axis transverse with respect to said guiding rails, between a raised operative position, in which the elements carried by said frame engage the floor panel and the sides of the body to be assembled, and a lowered inoperative position, at which said frame may be loaded with the elements forming the rear portion of a new body to be assembled.

A further preferred feature of the invention lies in that at least some of said programmable robots are provided with means for automatically replacing the respective welding head with a tool adapted to pick up auxiliary components of the body to be welded and position them on the body to enable welding thereof.

The loading of the component elements on the locating gates, when the latter are in the waiting position, as well as on said third transverse frame, if this is provided, may be carried out either automatically, by manipulating robots, or manually, depending upon the characteristics of the application. In case of manual loading, the device according to the invention is preferably provided with protecting screens which are moved automatically to an operative position in which they separate the area to which the operators have access in order to carry out the above described loading operation, with respect to the area of the welding station where the robots may still be operating simultaneously with said manual loading operation.

BRIEF DESCRIPTION OF THE DRAWINGS

Further features and advantages of the invention will become apparent from the description which follows, with reference to the annexed drawings, given purely by way of non limiting example, in which.

DETAILED DESCRIPTION OF THE INVENTION

Figure 7:
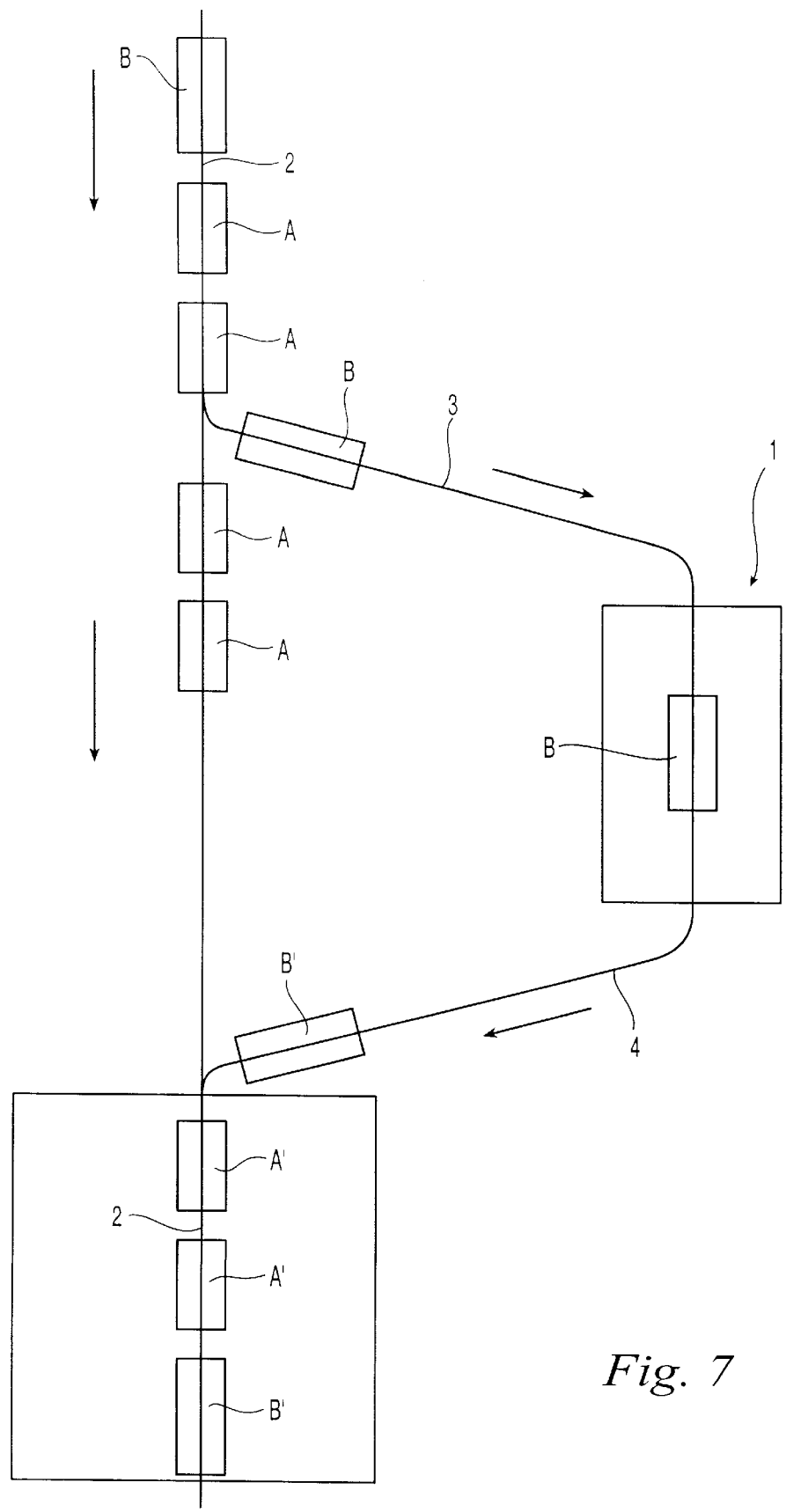
FIG. 7 is a diagram in plan view of a portion of the production line in a plant making use of the device according to the invention.

With reference to FIG. 7, numeral 1 generally designates a device according to the invention, shown diagrammatically in plan view, which is for assembling motor-vehicle bodies by spot welding. Purely by way of example, FIG. 7 relates to the case in which the device according to the invention is used for producing motor-vehicle bodies of a station-wagon version within a plant which is for producing both the station-wagon version and other versions, such as the sedan and coupe version, of the same motor-vehicle model. In the case of this example of application, the plant comprises a single production line 2 along which the floor panel of the various versions of the bodies to be welded are fed in sequence. Yet in the case of the example illustrated in FIG. 7, the "short" floor panels, which are to be used for assembling the bodies of the sedan and coupe versions, are designated by letter A, whereas the "long" floor panels, which are for assembling the bodies of the station-wagon version, are designated by B. As shown, in the case of the example illustrated herein, the floor panels B which come from line 2 are detoured on a line 3 which takes them to the welding device 1 according to the invention, where they are assembled and welded with the remaining parts of the body. The welded bodies of the station-wagon version go out from device 1 according to the invention and return to the main production line 2 through a line 4. The final portion of line 2 which is shown in FIG. 7 then conveys a sequence of floor panels A and assembled bodies B' of the station wagon version. Line 2 takes these structures to the main part of the plant, where welding stations for the bodies of the sedan and coupe versions are provided. Line 2 advances intermittently through these stations at a cycle time corresponding to the time necessary for welding a body of the sedan or coupe version at the respective welding stations. The bodies B' which have been assembled already naturally pass through the welding stations arranged downstream of the line portion shown in FIG. 7 without being subject therein to any operation, so that they proceed through these stations with the same cycle time which characterizes the production of the sedan and coupe versions. The duration of the stop of floor panels B at the device 1 according to the invention is much grater than the duration of the stop of floor panels A at the respective welding stations (not shown in FIG. 7), but, due to the above described arrangement, this does not cause a slowing down in the cadence of the main production line 2.

Figure 3:
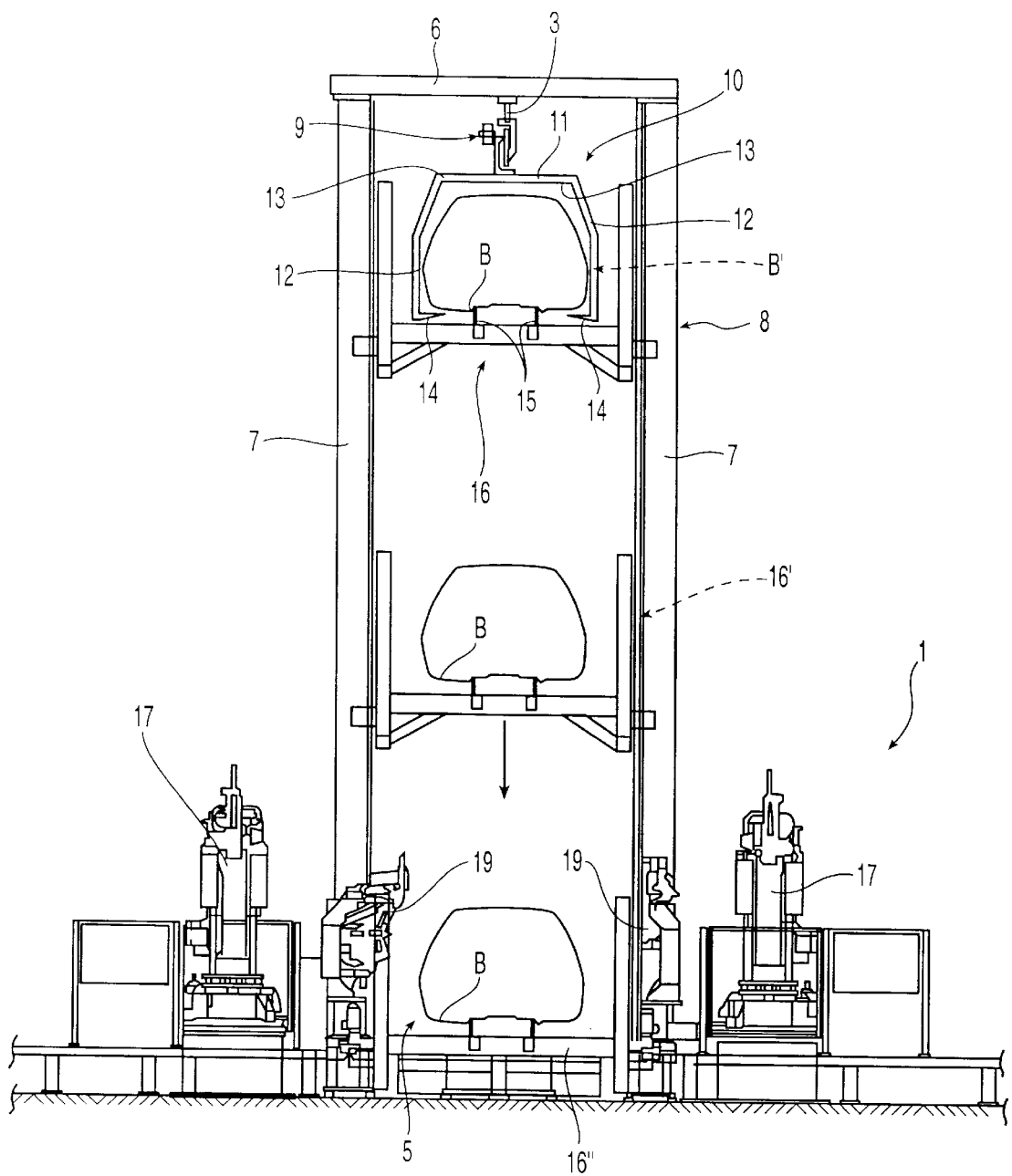
FIG. 3 is an end view, in elevation, of the device of FIGS. 1, 2.

With reference to FIG. 3, lines 3, 4 which fed floor panels B to device 1 according to the invention and the assembled bodies B' going out of device 1 are overhead conveyor lines which can be made in any known way. The details of construction of these conveyor lines are not shown herein both because, as indicated, they can be made in any known way, and since these details, taken alone, do not fall within the scope of the present invention. Furthermore, the deletion of these details from the drawings renders the latter simpler and easier to understand. With reference to FIG. 3, conveyor line 3 is constituted by a guiding profile supported at an elevated position relative to a welding station 5 by means of cross members 6 joining the upper ends of columns 7 forming part of a fixed supporting framework 8. On the guiding profile 3 there are guided motorized carriages 9 each carrying hook means 10 comprising an upper structure 11 and side arms 12 which can be opened by pivoting around axes 13 with respect to the upper structure 11 and ending with lower hooks 14 for supporting a floor panel B or an assembled body B'.

Figure 1:
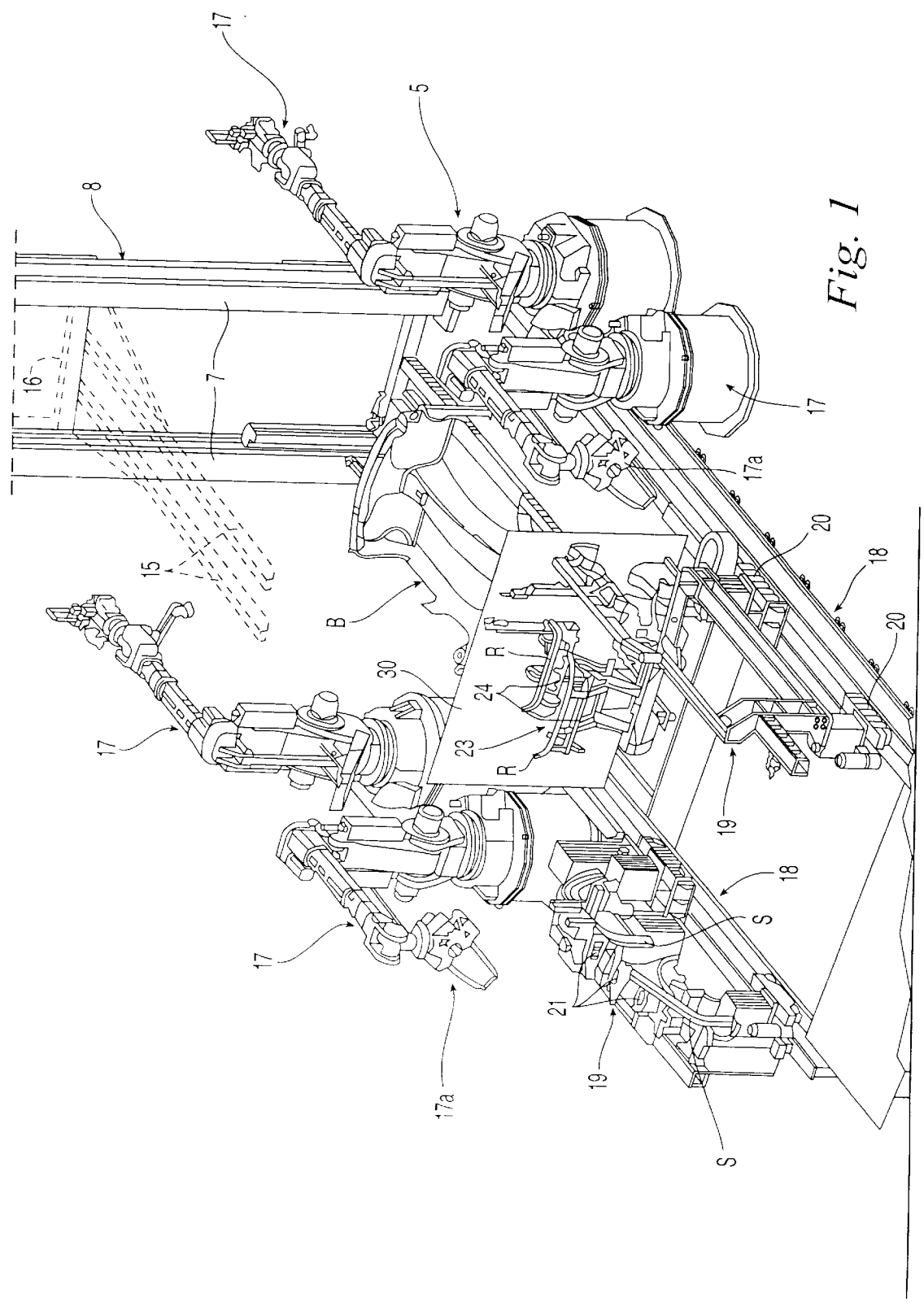
FIG. 1 is a perspective view of a preferred embodiment of the device according to the invention.
Figure 2:
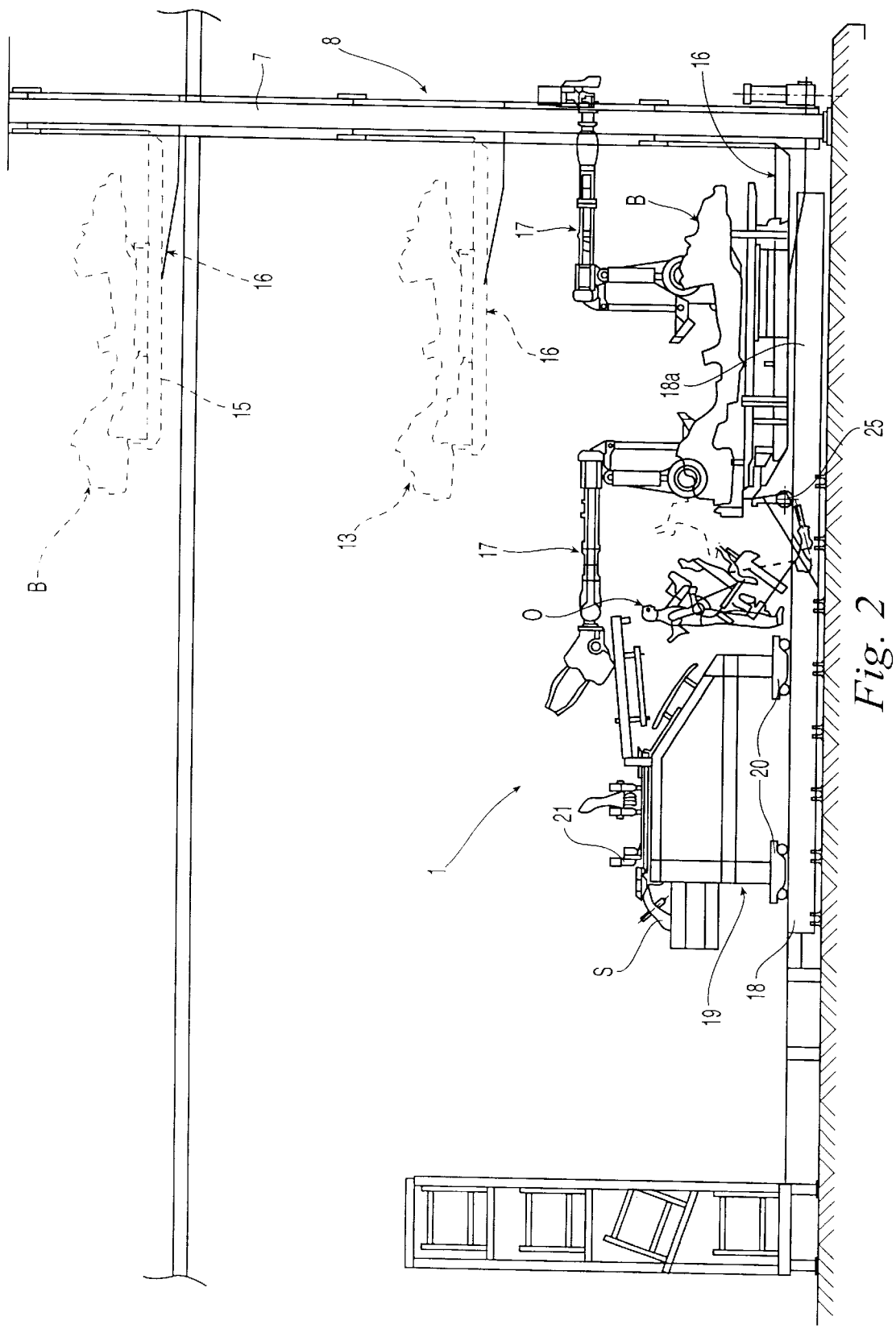
FIG. 2 is an elevational side view of the device of FIG. 1.

With reference also to FIGS. 1, 2, when a floor panel B carried by line 3 comes to the position over the welding station 5 of the assembling device 1 according to the present invention, said floor panel B is taken from two forks 15 of a lifting device 16. The lifting device 16 is vertically movable along two columns 7 of the fixed supporting framework 8. When the floor panel B reaches the position shown in FIG. 3, over the welding station 5, the forks 15 raise the floor panel B separating it from the hooks 14. The arms 12 may then by opened, whereafter the lifting device 16 is lowered (see intermediate position designated by 16' in FIG. 3) until they reach the lower position designated by 16" in FIG. 3, in which the floor panel B is deposited over the locating and locking means provided on the floor of the welding station 5.

As it will become apparent from the following, the welding station 5 is used for carrying out assembling and welding of the floor panel B with the remaining parts of a motor-vehicle body B'. At the end of this operation, body B' which is also shown by dotted lines in FIG. 3, is returned by an inverted series of operations with respect to those described above, to the upper plane of the overhead conveyor line 3, where it is taken from the hook means 10 for being conveyed along line 4 up to the main line 2 (FIG. 7).

The welding station 5 is provided with a plurality of programmable robots 17 (four robots, in the illustrated example) each provided with an electric spot welding head 17a. On the floor of the welding station 5 at the two sides of the site which receives the floor panel B there are provided two parallel guiding rails 18. On these rails 18 there are slidably mounted two locating gates 19 which are for receiving elements forming the sides of the body to be assembled and for taking them to the assembling position on floor panel B. Each locating gate 19 has a lower structure mounted on a pair of carriages 20, at least one of which is self-propelled. The details relating to the motor and reducing gear unit associated with one of carriages 20 or both carriages 20 in order to control movement thereof along the respective rail 18 are not shown herein, since also these elements can be made in any known way. Furthermore, self-propelled locating gates of the type indicated herein have been already shown for example in European Patent No. 0 642 878 and in the parallel U.S. Pat. No. 5,400,943. The upper part of gates 19 is provided, also in a way known per se, with devices 21 (in FIG. 1 devices 21 of the right-hand gate 19 have not been shown in order to render the structure of gate 19 more clear) adapted to receiving and supporting the component elements S of a respective side of the motor-vehicle.

The two locating gates 19 can be moved longitudinally along rail 18 between a waiting position (FIG. 1) spaced longitudinally from the site of the welding station 5 which receives the floor panel B and a working position, arranged at the two sides adjacent to floor panel B.

When the locating gates 19 are in their waiting position, they are able to receive thereon the component elements S of the two sides, which can be loaded thereon for instance manually, or automatically, by manipulating robots, depending upon the characteristics of the application. Once the component elements S of the two sides have been loaded on the two locating gates 19, the latter are moved along rail 18 from the waiting position shown in FIG. 1 to the working positions located at the two sides of floor panel B.

Figure 4:
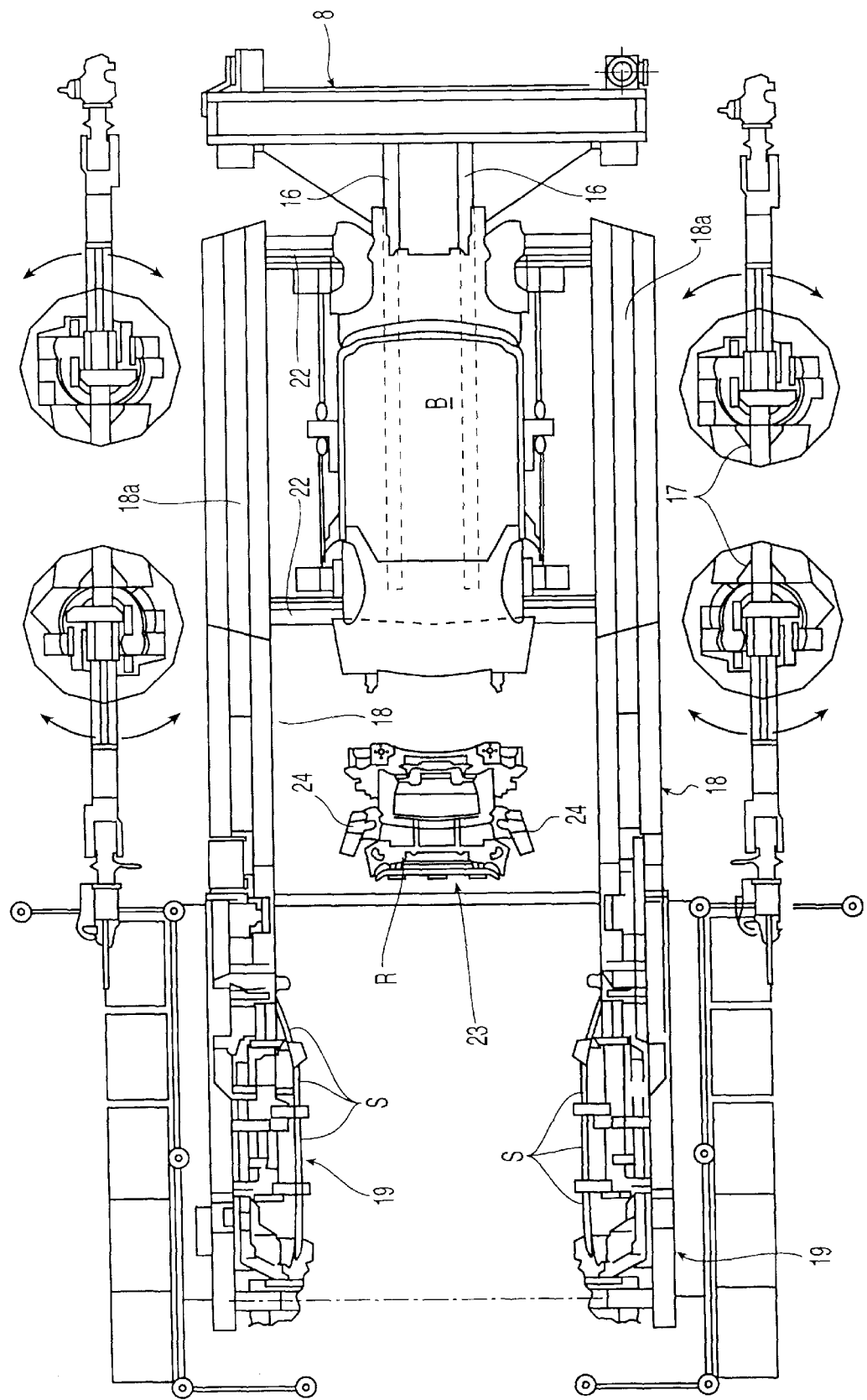
FIG. 4 is a plan view of the device of FIG. 1.
Figure 5:
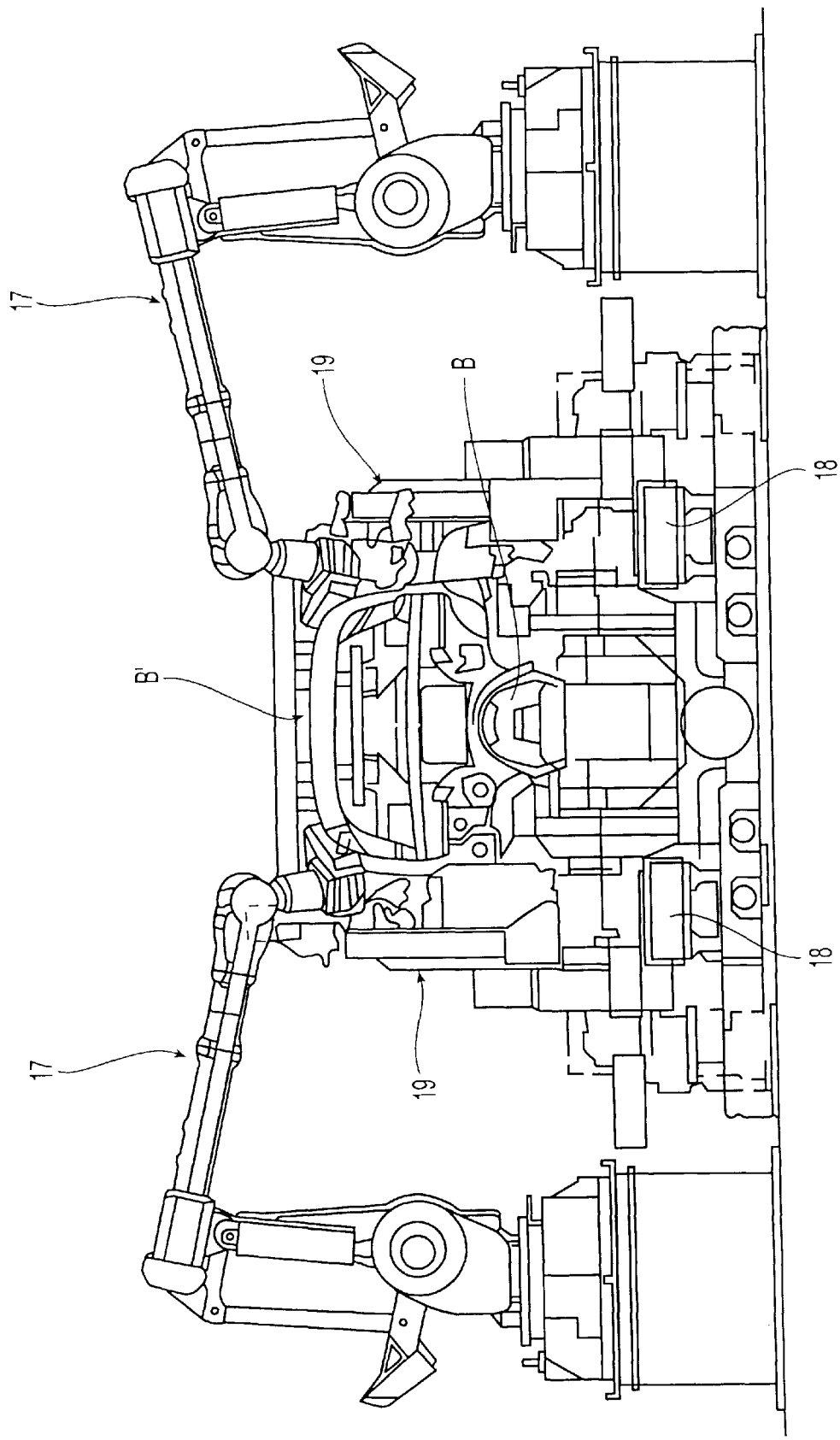
FIG. 5 is an end view, at an enlarged scale, of the welding station forming part of the device according to the invention.

According to a technique known per se, in this working position, the carriages 20 of the two gates 19 come onto two separate sections 18A (see FIG. 4) of the two rails 1, which are able to slide transversally to the longitudinal direction of rails 18, on cross rails 22 (FIG. 4). In this manner, the locating gates 19 move closer to each other until they reach an operative position in which the component elements of the sides carried by these gates come into engagement with floor panel B. In this condition, locking devices, also of a type known per se, carried by the locating gates 19, engage the component elements S of the body sides and the floor panel B locking them in the proper mutual position for assembling, and keep them in this condition while robots 19 enter into operation carrying out a first series of welding spots for framing the body.

When framing has ended, the locking devices of the locating gates 19 disengage from the body and the two rail sections 18A open again so that the two locating gates 19 can be returned to their waiting position showed in the drawings. In the meantime, the body, which is now able to support itself, is still being welded by robots 19, which carry out a second series of welding spots for completing welding. While robots 17 carry out this welding completion, the locating gates 19 are able to receive the component elements S of the body sides of a new body to be welded. When the body which is at the welding site is finished, it is again taken from forks 15 of the lifting device 16 and raised again up to the level of the overhead conveyor line 3, where it is taken from the hook means 10. Line 3 can advance by once step so as to bring a new floor panel B to the position over the welding station 1. The new floor panel can then be lowered by the lifting device 16 in order to receive afterwards the body sides of the new body to be welded from the locating gates 19 which in the meantime have returned to their working position.

According to a further feature of the invention, the device comprises a third locating frame 23 provided with locating and locking devices 24 for the component elements R of the rear part of the body of the motor-vehicle. The third locating frame 23 is arranged transversally to the longitudinal direction of rails 18, in the space therebetween, and is pivotally mounted around a transverse axis 25, between a lowered position, shown in the drawings by dotted lines, and a raised position. In the lowered position, an operator O may load manually the components R on the locating frame 23. In the raised position, the frame 23 brings these component elements R into engagement with floor panel B and body sides S which are at the welding station, so that they can be welded with each other.

Figure 6:
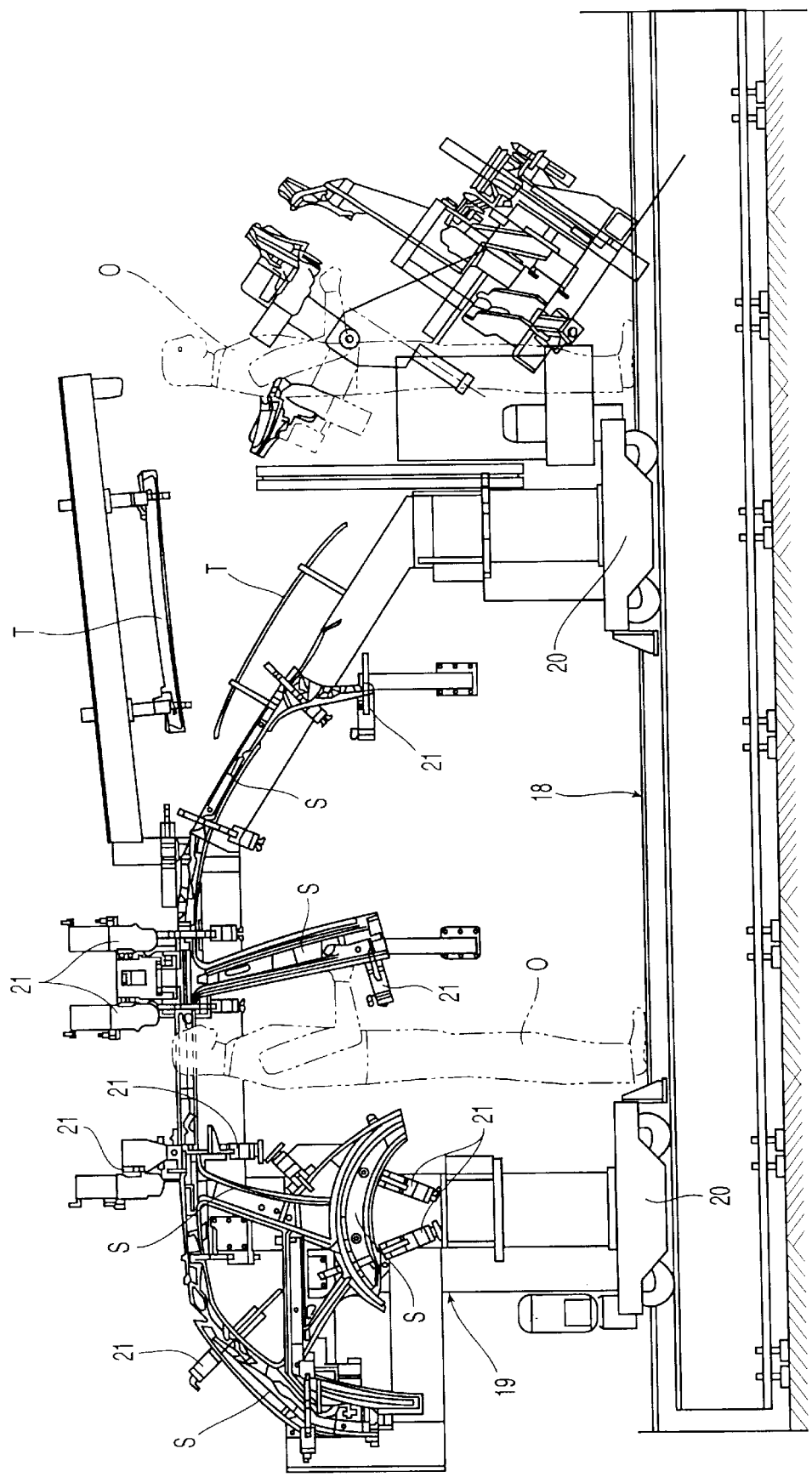
FIG. 6 is a view at an enlarged scale of a detail of FIG. 2.

According to a further feature (FIG. 6) each locating gate 19 is also used for supporting component elements T of the body which are to be mounted transversally between the two body sides. At least some of the robots 17 are provided with a device for automatically replacing their tool and are able to deposit the respective welding head into a magazine (not shown) provided for this purpose adjacent to the robot and to pick up a gripping tool which is used for gripping the component elements T and for bringing them to the proper position for welding, which is carried out by the other robots. Similarly, robots provided with a gripping tool may be used for bringing further components of the body into their proper position for welding, these components having to be assembled necessarily at a second time, subsequent to the assembling of the main components.

As indicated already, the locating and supporting devices 21 of each locating gate 19 (see for instance FIG. 6) are not shown in detail since they can be made in any known way. Typically, this devices comprises resilient stop means which enable the operators O to manually load the elements on gates 19, connecting this elements to the gates with simple and rapid operations, while allowing these component elements to be disengaged later from the locating gates 19, once the body has received a number of welding spots sufficient for rendering the presence of locating gates 19 no longer necessary. Yet according to what has been indicated in the foregoing, the locating gates 19 are further provided with conventional locking devices, typically have pneumatic actuators, able to lock the various elements forming the body with each other.

In operation of the device, when a floor panel B is carried by the lifting device 8 down to the welding station, the locating gates 19, which have the component elements S of the body sides already loaded thereon, move longitudinally along rails 18 until they reach their working position, at which they can then be moved transversally closer to each other so as to allow assembling of the various component elements of the body sides S with floor panel B. At the same time, one or more robots 17 provided with gripping tools attend to assembling the cross elements T for connecting the body sides with each other. While the locking devices of the locating gates 19 keep the above mentioned components in the proper position for assembling, the robots 17 provided with welding heads carry out a first series of electric welding spots. At the end of this stage, the locating gates 19 move transversally away from the two sides of the framed body, which does not require any longer to be supported by the locating gates. The latter can then be returned to their waiting position shown in FIG. 3, in which the operators O may begin to load the component elements S of a new body, while robots 17 carry out a second series of welding spots for completing welding. At the end of this second stage, the robots can be withdrawn from the structure and the lifting device 8 can return the welded body B' to the overhead conveyor line, where the body is taken from a hook device 10 for being moved along line 4 and then introduced again into the main production line 2 (FIG. 7).

In order to protect operators which load component elements S on the locating gates 19 when the latter are in their waiting position while robots 17 are still welding the previous body, preferably the device has one or more protective screens of a type designated by 30 in FIG. 1, which are automatically moved between an operative position (shown in FIG. 1) and an inoperative position. The annexed drawings do not show the means for guiding and controlling the movement of screens 30, since they can be made in any known way.

From the foregoing description, it is clearly apparent that the device according to the invention has great advantages from the standpoint of reduced dimensions and production efficiency.

The locating gates 19 have lower self-propelled carriages and therefore do not require the provision of heavy and bulky guiding frameworks. Feeding floor panels B along the vertical direction, by means of the lifting device 8, enables the dimensions of the welding station to be further reduced. The adoption of locating gates which are moved longitudinally between a working position and a waiting position, even it the station operates on a single type of body (so that automatic interchange of many pairs of locating gates is not necessary) enables the component elements of the body sides of the new body to be loaded on the locating gates when the station is still carrying out welding of the previous body. As indicated already, a welding station of the above described type is particularly adapted to carry out welding of bodies of the station-wagon type, without jeopardizing the whole plant wherein also other versions (such as a sedan and a coupe versions) are being produced of the same model, with respect to cycle time and number of robots used at each welding station.

Naturally, while the principle of the invention remains the same, the details of construction and the embodiments may widely vary with respect to what has been described and illustrated purely by way of example, without departing from the scope of the present invention.

What is claimed is:

1. Device for assembling motor-vehicle bodies by spot welding, comprising:

a welding station, provided with programmable robots having spot welding heads, means for feeding floor panels of motor-vehicle bodies in sequence to the welding station, a pair of locating gates on two opposite sides of the welding station, provided with devices for receiving and supporting component elements of two motor-vehicle body sides which are to be assembled with a respective floor panel, wherein said locating gates are provided with self-propelled lower carriages guided on two parallel rails provided on the floor of the welding station, at the two sides thereof, wherein said locating gates are movable on said rails, between a working position, adjacent to the two sides of the floor panel which is at the welding station, and a waiting position, spaced longitudinally from the work position, wherein when said locating gates are in their waiting position, they are able to receive and support the component elements of the sides of a body to be assembled, wherein when said locating gates are in their working position, they are able to move transversally with respect to the longitudinal direction of said rails, coming closer to each other until they reach an operative position immediately adjacent to the floor panel which is at the welding station, wherein said locating gates are provided with locating and locking means adapted to enter into operation when said gates are in said operative position for causing engagement of the component elements of the body sides carried by said gates and the floor panel which is at the welding station with each other, in order to keep them in a position proper for assembling the body, while said robots carry out a series of welding spots, and means for feeding the assembled body out of the welding station, and further wherein:

said means for feeding the floor panels to the welding station and the means for feeding the assembled bodies out of the welding station are constituted by an overhead conveyor line, located at an elevated position relative to the welding station, and comprising a line portion upstream of the welding station, for conveying the floor panels to be assembled, and a line portion downstream of the welding station for conveying the assembled bodies, as well as by a lifting device provided with vertically movable supporting means, for picking up a floor panel from the overhead conveyor line and lowering it down to the welding station, where it is taken from said receiving and supporting means provided at the welding station, and then for lifting the assembled body from the welding station up to the overhead conveyor line, said programmable robots are able to carry out a number of welding spots for framing the body firstly, while the latter is being locked by the locating gates, and later on a number of a welding spots for completing welding, while the locating gates have already been disengaged from the body and have been returned to their waiting position, at which they are able to receive the component elements of the sides of a new body, simultaneously with the execution of said welding spots for completing welding of the body which is at the welding station, and wherein the assembly device is inserted in a line for production of motor-vehicle bodies of one version arranged in parallel with a main production line for production of bodies of other versions of the same model of motor-vehicle.

2. Assembling device according to claim 1, wherein at the welding station, transversally to said guiding rails, there is provided a third locating frame for receiving and locking component elements of the rear part of the body to be assembled, said locating frame being pivotally mounted around an axis transverse relative to said guiding rails, between a raised operative position, in which the elements carried by said frame engage the floor panel and the sides of the body to be assembled, and a lowered inoperative position, in which said frame may be loaded with the component elements of a new body to be welded.

3. Assembling device according to claim 1, wherein at least some of said programmable robots are provided with means for automatically replacing the respective welding head with a tool able to grip auxiliary component elements of the body to be welded as well as to position these elements in the assembling condition, for welding thereof.

4. Assembling device according to claim 1, wherein at least part of said auxiliary components are carried by one or both of said locating gates.

5. Assembling device according to claim 1, wherein there are provided screen means movable between an operative position and an inoperative position, which in their operative position are able to separate the area of the welding station from the area corresponding to the waiting position of said locating gates.

* * * * *